United States Patent [19]

Vogt et al.

[11] 4,062,810

[45] Dec. 13, 1977

[54] CARRIER-SUPPORTED CATALYST

[75] Inventors: Wilhelm Vogt, Huth-Efferen; Hermann Glaser, Erftstadt Lechenich; Helmut Dyrschka, Erftstadt Kottingen, all of Germany

[73] Assignee: Hoechst Aktiengesellschaft, Frankfurt am Main, Germany

[21] Appl. No.: 718,331

[22] Filed: Aug. 27, 1976

Related U.S. Application Data

[63] Continuation of Ser. No. 557,925, March 13, 1975, abandoned.

[30] Foreign Application Priority Data

Mar. 14, 1974 Germany ............................. 2412230

[51] Int. Cl.$^2$ ............................................. B01J 23/10
[52] U.S. Cl. ................................. 252/462; 423/213.2
[58] Field of Search ...................... 252/462; 423/213.2

[56] References Cited

U.S. PATENT DOCUMENTS

| | | | |
|---|---|---|---|
| 3,322,491 | 5/1967 | Barrett et al. ................... | 252/462 X |
| 3,407,030 | 10/1968 | Clifford et al. ................... | 423/213.2 |
| 3,865,923 | 2/1975 | Stephens .......................... | 252/462 X |
| 3,885,019 | 5/1975 | Matsushita et al. ............... | 423/213.2 |

*Primary Examiner*—W. J. Shine
*Attorney, Agent, or Firm*—Connolly and Hutz

[57] ABSTRACT

The invention provides a carrier-supported catalyst, wherein alumina partially converted to $\alpha$-Al$_2$O$_3$ is the carrier having between 0.2 and 10 weight % of cerium in oxide form deposited thereon as the catalytically active ingredient.

The carrier supported catalyst is made by compressing hydrous alumina or unstable anhydrous alumina into shapes. The shapes are annealed for 10–20 hours at 1000°–1250° C. The annealed shapes are impregnated with an aqueous solution of a cerium salt of a readily decomposable acid and dried at 130°–150° C. The dry cerium salt is decomposed by gradually heating the shapes at 20°–300° C and 450°–550° C, respectively, and the resulting cerium oxide-containing shapes are annealed at 700°–900° C.

4 Claims, No Drawings

CARRIER-SUPPORTED CATALYST

This application is a continuation of application Ser. No. 557,925 filed Mar. 13, 1975 now abandoned.

The present invention relates to a carrier-supported catalyst and to a process for making it.

Carbon monoxide and hydrocarbons are oxidized in contact with catalysts, wherein the active ingredients are either noble metals belonging to group VIII of the Periodic System or are mixed oxides, e.g. of copper, manganese and nickel, the mixed oxides, which are less costly, being preferred so as to enable wide use to be made of those catalysts, e.g. for the decontaminations of automobile exhaust gas. The catalysts used to this end are required to be abrasionproof, to be thermally shockproof, to be sinterproof, to have a low starting temperature, if possible lower than 200° C, and to have a constant activity, even if heated for prolonged periods of time to temperatures of at least 800° C.

U.S. Pat. No. 3,493,325 describes a catalyst deposited, e.g. on gel-like or activated alumina, for the catalytic oxidation of exhaust gas of internal combustion engines. The active ingredients applied to the carrier are selected from oxides of copper, nickel, cobalt, iron, chromium, manganese or mixtures thereof.

A further catalyst has been described in German Patent Specification 1 272 896, which is deposited on a carrier containing at least 30 weight % of alumina together with alkali metal and alkaline earth metal oxides, and heat-resistant filler materials. The catalytically active ingredients inter alia include oxides of copper, nickel, cobalt, manganese and cerium.

These prior art catalysts are not fully satisfactory, however, as their activity varies depending on whether they are contacted with an oxidizing or reducing gas. More particularly, they are highly active if contacted with a mixture consisting of the gas to undergo oxidation and a stoichiometric or slightly understoichiometric proportion of oxygen, whilst they are less active if contacted with a mixture containing an excess of oxygen.

In other words, it is necessary for those prior art catalysts to be contacted with a gas mixture containing a stoichiometric proportion of oxygen, based on the carbon monoxide and hydrocarbons present in the gas mixture. This is especially necessary in an attempt (a) to maintain the catalyst active and (b) to ensure complete combustion of the gas to undergo oxidation. It should be borne in mind, however, that the exhaust gases of internal combustion engines always contain variable proportions of carbon monoxide and hydrocarbons so that considerable expenditure in respect of equipment is at least necessary to achieve this, if at all.

It is accordingly an object of the present invention to provide a carrier-supported catalyst whose activity remains unaffected in contact with gas mixtures, irrespective of the oxygen concentration therein, and which additionally has a low starting temperature.

To this end, the invention provides a carrier-supported catalyst, wherein alumina partially converted to $\alpha\text{-Al}_2\text{O}_3$ is the carrier and cerium in oxide form is the catalytically active ingredient, the catalytically active ingredient constituting 0.2 to 10 weight % of the carrier being deposited thereon.

Further preferred features provide:

a. for the alumina to be poor in alkalies;

b. for the alumina to contain at most 0.2 weight % of alkalies, and c. for 0.5 to 8 weight % of cerium in oxide form to be deposited on the carrier.

The invention also provides a process for making the carrier-supported catalyst, which comprises compressing hydrous alumina or unstable anhydrous alumina into shapes; annealing the shapes for periods within the range 10 and 20 hours at temperatures within the range 1000° and 1250° C; impregnating the annealed shapes with an aqueous solution of a cerium salt of a readily decomposable acid; drying the cerium salt so applied to the shapes at temperatures within the range 130° and 150° C.; decomposing the dry cerium salt by gradually heating the shapes to temperatures within the range 200° and 300° C and 450° and 550° C, respectively; and annealing the resulting shapes containing cerium oxide at temperatures within the range 700° and 900° C.

Further preferred features of the present invention for making the carrier-supported catalyst provide:

d. for boehmite to be used as the hydrous alumina;

e. for $\delta\text{-Al}_2\text{O}_3$ to be used as the unstable anhydrous alumina;

f. for the alumina to be compressed in admixture with graphite;

g. for the alumina to be compressed in admixture with between 3 and 10 weight %, preferably 5 weight %, of graphite;

h. for the graphite to be burnt off prior to the annealing step;

i. for the graphite to be burnt off at temperatures within the range 550° and 750° C, preferably 650° C; and j. for cerium nitrate to be used as the cerium salt of a readily decomposable acid.

The carrier-supported catalyst of the present invention is particularly useful for the oxidation of carbon monoxide and hydrocarbons with an excess of oxygen to ensure complete combustion thereof.

Vital to the present catalyst is more particularly the alumina carrier, which is partially converted to $\alpha\text{-Al}_2\text{O}_3$. Carrier-supported catalysts having the catalytically active cerium oxide applied to incompletely dehydrated aluminum oxide monohydrate or to highly crystalline $\alpha\text{-Al}_2\text{O}_3$ are considerably less active catalytically.

In addition to this, it is necessary for the alumina carrier to contain little alkali as alkalies are known to increase the starting temperature of carrier-supported catalysts.

The cerium salt used in aqueous solution for impregnating the carrier and applying the catalytically active ingredient thereonto should have an anion which can be completely removed later, during calcination. The preferred cerium salt is cerium nitrate. Cerium sulfate produces catalysts of reluctant activity.

The carrier should preferably be impregnated with a quantity of cerium salt solution which just corresponds to its volume of pores. In other words, it is the concentration of the cerium salt solution used for impregnation and the volume of pores of the carrier which determine the cerium content of the resulting carrier-supported catalyst.

With respect to catalysts having a low starting temperature, it is necessary for them to be made with the use of very pure cerium salt. So-called cerium mixed metal salts should conveniently not be used.

Qualitatively highly reliable carrier-supported catalysts are obtained in those cases in which the cerium salt applied to the carrier is dried over a prolonged period of time within the range 16 and 64 hours, for example.

The carrier-supported catalysts used in the following Examples were cylindrical shapes 3 mm in diameter and 3 mm long. 17 normal liters (S.T.P.), per cc of catalyst per hour, of a test gas mixture was oxidized in contact therewith. The gas mixture contained 3% by volume of $O_2$, 2% by volume of CO, 1000 ppm of n-hexane, 2.5% by volume of steam, the balance being $N_2$, and was heated in each particular case to the testing temperature. The residual concentrations of CO and n-hexane were identified in the oxidized gas and the conversion in % of these two substances was calculated therefrom.

The temperatures at which 50 and 90%, respectively, of CO and n-hexane, respectively, were found to have been converted to $CO_2$ and $H_2O$ ($U_{50\ CO}$; $U_{90\ CO}$; $U_{50\ Hex}$; $U_{90\ Hex}$) were used as the activity indexes of the catalyst.

EXAMPLE 1: (Comparative Example)

$Ce(NO_3)_3 \cdot 6\ H_2O$ was dried until the nitrate commenced decomposition and compressed into shapes. The shapes were heated for 10 hours to temperatures within the range 500° and 800° C, with the supply of air. The catalytic activity was determined and the following results were obtained:

| $U_{50\ CO} = 430°$ C | $U_{50\ Hex} = 560°$ C |
|---|---|
| $U_{90\ CO} = 540°$ C | $U_{90\ Hex} = 660°$ C. |

EXAMPLE 2: (Invention)

$\delta$-$Al_2O_3$ (Aluminum oxide "C," a product of Degussa) was suspended in water and compacted therein. The resulting highly viscous magma was dried, admixed with 3 weight % of graphite and ground. The ground material was compressed into shapes which were first heated to 650° C to burn off the graphite and then annealed for 20 hours at 1100° C. The carrier so made was impregnated with a cerium(III)nitrate solution and dried for 64 hours at 140° C. To decompose the cerium nitrate, the carrier was first heated for 3 hours to 250° C and then for 10 hours to 500° C. The resulting cerium oxide-containing shapes were finally annealed for 10 hours at 800° C. Catalysts containing 2, 4 and 6 weight %, respectively, of cerium were made in this manner. Their activity was determined and the following results were obtained:

|  | Ce-content in weight % | | |
|---|---|---|---|
|  | 2 | 4 | 6 |
| $U_{50\ CO}$ [° C] | 190 | 170 | 160 |
| $U_{90\ CO}$ [° C] | 270 | 240 | 205 |
| $U_{50\ Hex}$ [° C] | 565 | 540 | 505 |

EXAMPLE 3: (Invention)

$\delta$-$Al_2O_3$ (Aluminum oxide "C," a product of Degussa) was made into shapes in the manner described in Example 2. The graphite used as a compression aid was burnt off and shape specimens were annealed in each case for 20 hours at temperatures of 950°, 1000°, 1050°, 1100°, 1150°, 1200°, 1250° and 1300° C, respectively. Following this, 6 weight % of cerium was applied to the individual specimens, in the manner described in Example 2. The activity of the resulting catalysts was determined and the following results were obtained:

| Carrier annealed at ° C | [° C] | | | |
|---|---|---|---|---|
|  | $U_{50\ CO}$ | $U_{90\ CO}$ | $U_{50\ Hex}$ | $U_{90\ Hex}$ |
| (950) | 500 | 730 | 620 | 740 |
| 1000 | 450 | 580 | 620 | 740 |
| 1050 | 260 | 380 | 560 | 700 |
| 1100 | 160 | 205 | 505 | 640 |
| 1150 | 190 | 270 | 560 | 670 |
| 1200 | 190 | 305 | 565 | 680 |
| 1250 | 240 | 350 | 570 | 690 |
| (1300) | 270 | 390 | 600 | 730 |

EXAMPLE 4: (Invention)

Boehmite (AlOOH) containing 0.03 weight % of sodium was compressed into shapes in the manner described in Example 2. The graphite used as a compression aid was burnt off and shape specimens were annealed in each particular case for 20 hours at temperatures of 900°, 1000°, 1100°, 1200° and 1250° C, respectively. Following this, 6 weight % of cerium was applied to the individual specimens, in the manner described in Example 2. The activity of the resulting catalysts was determined and the following results were obtained:

|  | Carrier annealed at ° C | | | | |
|---|---|---|---|---|---|
| [° C] | 900 | 1000 | 1100 | 1200 | 1250 |
| $U_{50\ CO}$ | 460 | 420 | 400 | 360 | 280 |
| $U_{90\ CO}$ | 610 | 530 | 510 | 450 | 450 |
| $U_{50\ Hex}$ | 590 | 600 | 530 | 610 | 600 |

EXAMPLE 5: (Carrier Containing Alkali)

The carrier-supported catalyst prepared in the manner described in Example 2 was impregnated with the quantity of potassium carbonate solution which was necessary to incorporate 0.5 weight % of $K_2CO_3$ therein, then dried at 140° C and annealed for 10 hours at 800° C. The activity was determined and the following results were obtained:

$U_{50\ CO} = 335°$ C
$U_{90\ CO} = 450°$ C
$U_{50\ Hex} = 620°$ C

EXAMPLE 6: (Carrier Containing Alkali)

Bayerite ("Martifin," a product of Martinswerk, Bergheim) containing about 0.25 weight % of sodium (this is sodium originating from the particular process used for making the product) was compressed into shapes, in the manner described in Example 2. The graphite used as a compression aid was burnt off and shape specimens were annealed in each particular case for 20 hours at temperatures of 900°, 1000°, 1100°, 1200° and 1300° C, respectively. Following this, 6 weight % of cerium was applied to the individual carrier specimens, in the manner described in Example 2. The activity of the resulting catalysts was determined and the following results were obtained:

|  | Carrier annealed at ° C | | | | |
|---|---|---|---|---|---|
| [° C] | 900 | 1000 | 1100 | 1200 | 1300 |
| $U_{50\ CO}$ | 510 | 430 | 410 | 320 | 330 |
| $U_{90\ CO}$ | 620 | 510 | 530 | 450 | 460 |
| $U_{50\ Hex}$ | 590 | 570 | 610 | 600 | 610 |

EXAMPLE 7: (Less Readily Decomposable Cerium Salt)

A catalyst containing 6 weight % of cerium was prepared in the manner described in Example 2 save that cerium sulfate was substituted for cerium nitrate. The activity of the catalyst so made was determined in a series of tests. Between the individual tests, the catalyst below the test gas mixture was annealed in each particular case for 10 minutes at 800° C.

| Activity determination | $U_{50\ CO}[° C]$ | $U_{90\ CO}[° C]$ | $U_{50\ Hex}[° C]$ |
|---|---|---|---|
| 1 | 430 | 530 | 590 |
| 2 | 350 | 450 | 580 |
| 3 | 290 | 390 | 560 |
| 4 | 260 | 360 | 540 |
| 5 | 240 | 340 | 530 |
| 6 | 220 | 330 | 530 |

EXAMPLE 8: (Mixture of Rare Earths)

Catalysts containing 6 weight % of rare earths were prepared in the manner described in Example 2 save that the cerium nitrate was replaced by salt solutions produced by dissolving cerium mixed metals of the following composition:

| Alloy A: | 56 % of Ce | Alloy B: | 49 % of Ce |
|---|---|---|---|
| | 28 % of La | | 23 % of La |
| | 10 % of Nd | | 15% of Nd |
| | 4 % of Pr | | 12% of Pr + Y |
| | 2 % of further r.e. | | 1% of further r.e. | in nitric acid. The activity was determined and the following results were obtained:

| | Cerium mixed metal alloy: | |
|---|---|---|
| | A | B |
| $U_{50\ CO}[° C]$ | 280 | 330 |
| $U_{90\ CO}[° C]$ | 380 | 430 |
| $U_{50\ Hex}[° C]$ | 550 | 525 |

EXAMPLE 9: (Annealing Period and Temperature)

The catalyst prepared in the manner described in Example 2 which had the following activity:

$U_{50\ CO} = 160°$ C
$U_{90\ CO} = 205°$ C
$U_{50\ Hex} = 505°$ C was annealed for 13 hours at 1100° C and then had the following activity:

$U_{50\ CO} = 185°$ C
$U_{90\ CO} = 280°$ C
$U_{50\ Hex} = 530°$ C

A catalyst was prepared in the manner described in Example 2 save that the annealing step at 700°–900° C was omitted and replaced by heat treatment at 300°–400° C, after decomposition of the cerium salt. The catalyst so made had the following activity:

$U_{50\ CO} = 185°$ C
$U_{90\ CO} = 355°$ C
$U_{50\ Hex} = 535°$ C

EXAMPLE 10

Basic aluminum chloride $Al_2(OH)_5Cl \cdot 3 H_2O$ ("Locron," a product of Farbwerke Hoeschst AG) was dissolved in water and the solution was admixed with the quantity of cerium nitrate necessary to obtain a catalyst containing 6% of cerium. The whole was admixed with ammonia to jointly precipitate the Al and Ce hydroxides. The precipitate was filtered off, scrubbed with water and dried. After the addition of 5 weight % of graphite, the dry precipitate was compressed into shapes. The graphite was burnt off at 650° C and the shapes were annealed for 20 hours at 800° C. The activity was determined and the following results were obtained:

$U_{50\ CO} = 330°$ C
$U_{90\ CO} = 450°$ C
$U_{50\ Hex} = 540°$ C
$U_{90\ Hex} = 640°$ C.

We claim:

1. A carrier-supported catalyst, wherein the active ingredient consists essentially of cerium in oxide form and wherein 0.2 to 10 weight% of cerium, based on the carrier, is deposited thereon and wherein the carrier is produced by suspending aluminum oxide selected from the group consisting of delta-alumina and boehmite, and having an alkali content of up to 0.2 weight%, in water; heating the resulting highly viscous magma so as to form a dry mass; admixing graphite to the dry mass and grinding it; compressing the ground graphite-containing mass into shapes; burning off the graphite from the shapes at temperatures within the range 550° to 750° C; and calcining the shapes for periods within the range 10 to 20 hours at temperatures within the range 1000° to 1250° C.

2. A process for making the carrier-supported catalyst as claimed in claim 1, which comprises suspending aluminum oxide selected from the group consisting of delta-alumina and boehmite, and having an alkali content of up to 0.2 weight%, in water; heating the resulting highly viscous magma so as to form a dry mass; admixing graphite to the dry mass and grinding it; compressing the ground graphite-containing mass into shapes; burning off the graphite from the shapes at temperatures within the range 550° to 750° C; calcining the shapes for periods within the range 10 to 20 hours at temperatures within the range 1000° to 1250° C impregnating the shapes with an aqueous solution of a cerium salt of a readily decomposable acid; drying the cerium salt so applied to the shapes for periods within the range 16 to 64 hours at temperatures within the range 130° to 150° C; decomposing the dry cerium salt by heating the shapes first at temperatures within the range 200° to 300° C and thereafter at temperatures within the range 450° to 550° C, respectively; and annealing the resulting shapes containing cerium oxide at temperatures within the range 700° to 900° C.

3. The process as claimed in claim 2, wherein between 3 and 10 weight% of graphite is admixed to the dry mass prior to grinding it.

4. The process as claimed in claim 2, wherein the cerium salt of a readily decomposable acid is cerium nitrate.

* * * * *